United States Patent
Campbell

(10) Patent No.: US 11,970,284 B2
(45) Date of Patent: Apr. 30, 2024

(54) PROBELESS AIRSPEED AND ANGLE OF ATTACK MEASUREMENTS FOR PROPELLER DRIVEN VEHICLES

(71) Applicant: Textron Innovations Inc., Providence, RI (US)

(72) Inventor: Kip Gregory Campbell, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 604 days.

(21) Appl. No.: 16/804,137

(22) Filed: Feb. 28, 2020

(65) Prior Publication Data

US 2021/0269170 A1 Sep. 2, 2021

(51) Int. Cl.
 *B64D 43/02* (2006.01)
 *G01C 23/00* (2006.01)
(52) U.S. Cl.
 CPC .............. *B64D 43/02* (2013.01); *G01C 23/00* (2013.01)
(58) Field of Classification Search
 CPC ......... B64D 43/02; G01C 23/00; G01C 21/20
 See application file for complete search history.

(56) References Cited

U.S. PATENT DOCUMENTS

| | | | | |
|---|---|---|---|---|
| 11,597,532 B2* | 3/2023 | Mikic | ................. | G01P 21/025 |
| 2016/0264019 A1* | 9/2016 | Drako | ................. | B60K 17/356 |
| 2018/0362146 A1* | 12/2018 | Klein | ..................... | B64C 27/08 |
| 2020/0348695 A1 | 11/2020 | Campbell | | |
| 2021/0055324 A1 | 2/2021 | Campbell | | |
| 2021/0108572 A1* | 4/2021 | Khalid | ................... | B32B 7/022 |

FOREIGN PATENT DOCUMENTS

CN 106886658 A * 6/2017

OTHER PUBLICATIONS

Johan Boutet, Grigorios Dimitriadis, Xavier Amandolese, A modified Leishman-Beddoes model for airfoil sections undergoing dynamic stall at low Reynolds numbers, Journal of Fluids and Structures, Jan. 6, 2020, vol. 93 (Year: 2020).*

* cited by examiner

*Primary Examiner* — Jelani A Smith
*Assistant Examiner* — Paul A Castro
(74) *Attorney, Agent, or Firm* — Bradley Arant Boult Cummings LLP

(57) ABSTRACT

An exemplary method to determine an airspeed and an angle of attack of a propeller powered vehicle includes determining the power delivered to the propeller, the air density, a propeller power coefficient, an advance ratio for the propeller, and the airspeed using the advance ratio and determining the angle of attack using the airspeed.

14 Claims, 3 Drawing Sheets

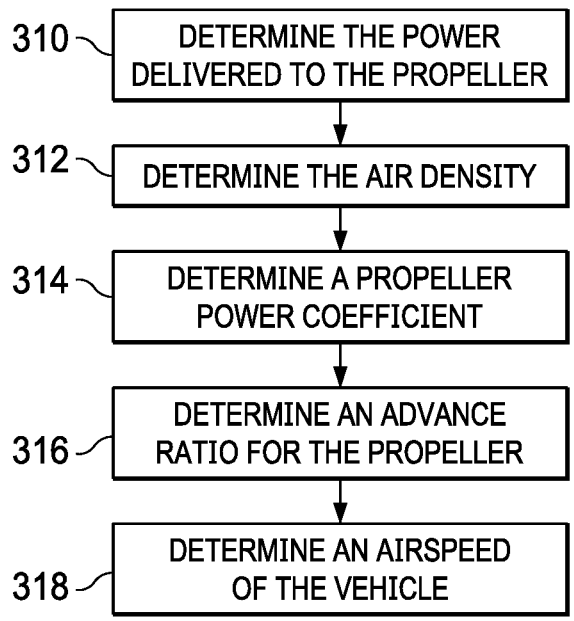
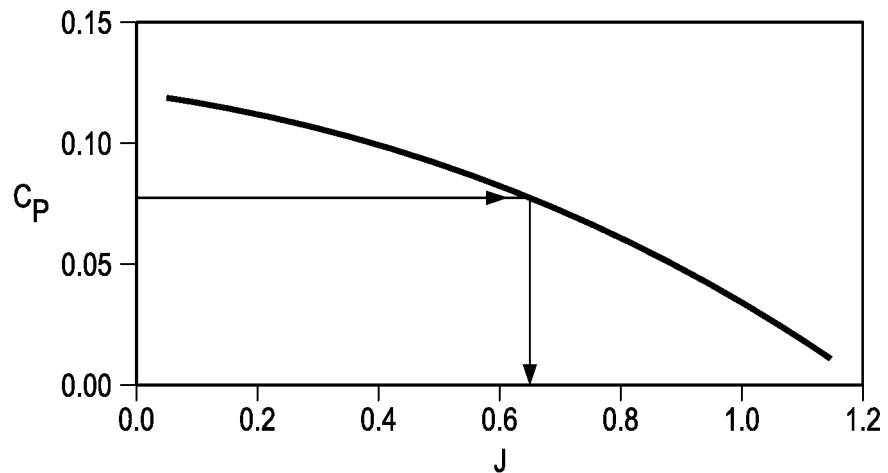

PROBELESS AIRSPEED AND ANGLE OF ATTACK MEASUREMENTS FOR PROPELLER DRIVEN VEHICLES

BACKGROUND

This section provides background information to facilitate a better understanding of the various aspects of the disclosure. It should be understood that the statements in this section of this document are to be read in this light, and not as admissions of prior art.

There is a desire, or need, to know the airspeed of vehicles in aerospace applications. For an aircraft, such as a small unmanned aerial vehicle (UAV) airspeed measurement can be cumbersome to acquire due to the dimensions of the required probes with respect to the size of the vehicle. Weight and expense in small low cost vehicles are also a major design consideration. Additionally, pitot-static probes on small vehicles are likely to suffer from errors in static pressure measurements due to tight proximity of the static ports to the airframe.

SUMMARY

An exemplary method to determine an airspeed of a propeller powered vehicle includes determining the power delivered to the propeller, determining the air density, determining a propeller power coefficient, determining an advance ratio for the propeller and determining the airspeed using the advance ratio.

An exemplary method of determining an angle-of-attack (AOA) of a propeller powered vehicle includes determining the airspeed of the vehicle, determining a dynamic pressure from the airspeed, determining a body normal coefficient and determining the AOA by using the body normal coefficient on a lookup curve of a plot comparing body normal coefficients to angles of attack.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

FIG. 3 illustrates an exemplary method of determining an airspeed of a propeller power vehicle.

FIG. 4 is a graphical illustration of a plot comparing propeller power coefficients with advance ratios.

DETAILED DESCRIPTION

Figure 1:
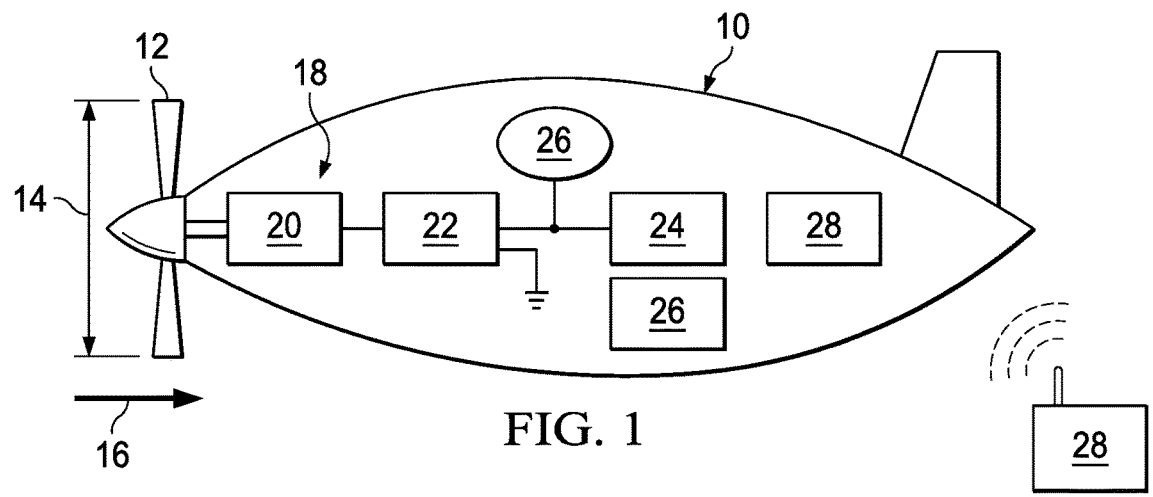
FIG. 1 is a schematic illustration of an exemplary propeller power vehicle.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 is a schematic illustration of an exemplary propeller powered aerial vehicle generally denoted by the numeral 10. Aircraft 10 is powered by a propeller 12 having a diameter 14 at an airspeed 16, e.g. true airspeed. In accordance to an embodiment, propeller 12 is a fixed pitch propeller. Propeller 12 is driven by a prime mover 18. In this example, prime mover 18 is a motor 20 and electronic speed control 22 coupled to electricity source 24. Vehicle 10 includes one or more sensors 26, such as, and without limitation, voltage sensors, current sensors, accelerometers, temperature sensors, and pressure altitude sensors. Vehicle 10 includes a flight computer 28 in communication with the operational components to fly vehicle 10 and to determine the airspeed and the angle of attack (AOA) of vehicle 10 without using a pitot-static probe. As will be understood by those skilled in the art with benefit of this disclosure, flight computer 28 may include one or more processors located on vehicle 10 and/or remote from vehicle 10.

Figure 2:
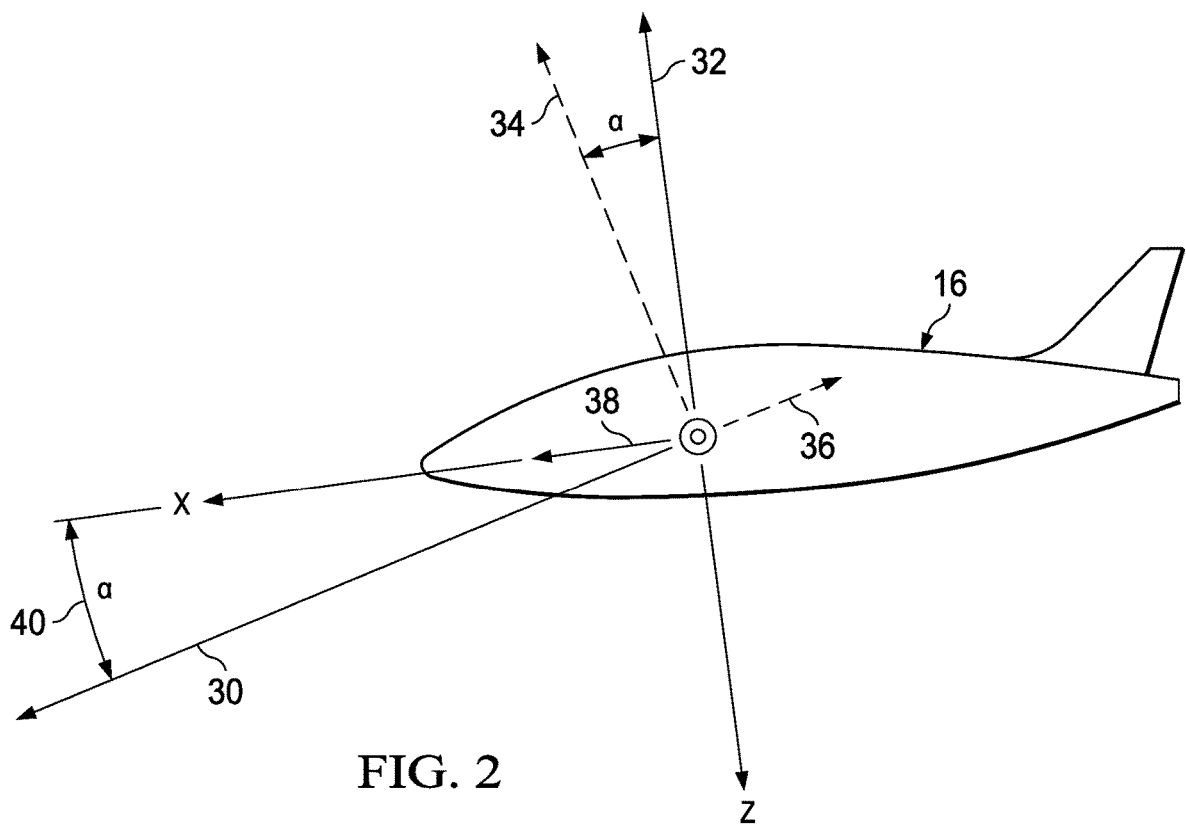
FIG. 2 is a schematic illustration of aerodynamic forces during flight.

FIG. 2 is a schematic illustration of vehicle 10 showing associated aerodynamic forces during flight. Vehicle 10 is propeller powered along a velocity vector 30 where the magnitude of velocity vector corresponds to airspeed 16. During flight, various forces act on aircraft 10 illustrated as a normal force 32, due to high pressure on the surface of vehicle 10, a lift force 34, a drag force 36, an axial force 38, and weight. In contrast to the normal force and axial force vectors, which are "body-fixed," lift and drag force vectors are not "body-fixed" and are normal and parallel, respectively, to the velocity vector. The angle of attack 40 is the angle between the direction of travel along velocity vector 30 and axial force vector 38 (X-axis).

With reference to FIGS. 1-6, FIG. 3 schematically illustrates an exemplary method 300 of determining an airspeed 16 of a propeller powered vehicle 10. At block 310, the power delivered to propeller 12 is determined. At block 312, an air density is determined. At block 314, a propeller power coefficient is determined. At block 316, an advance ratio for propeller 12 is determined. At block 318, an airspeed 16, e.g. true airspeed, is determined using the advance ratio.

Parameters, such as the voltage and current applied to motor 20, the rotational speed of propeller 12, the altitude, temperature, and motor efficiency, which includes the electronic speed control efficiency, are known and/or obtained during flight, for example, from measurements of sensors 26 and computed or obtained through lookup tables using sensor data. As understood by those skilled in the art with benefit of this disclosure, the various computations and lookups can be performed via flight computer 28.

At block 310, the power applied to propeller 12 can be determined, e.g., computed by flight computer 28, for example by multiplying the voltage, current and motor efficiency.

At block 312, the air density can be determined by various means. For example, the air density may be determined, e.g., computed by flight computer 28, using the altitude and air temperature.

At block 314, propeller power coefficient may be determined, e.g., computed by flight computer 28, through the following equation:

$$C_P = \frac{P}{\rho n^3 D^5}$$

In the equation, $C_P$ is the propeller power coefficient, P is the power, $\rho$ is the air density, n is the speed of propeller 12, and D is the diameter 14 of propeller 12.

At block 316, the advance ratio of propeller 12 is determined. In an embodiment, the advance ratio J is obtained by matching propeller power coefficient $C_P$ on a lookup curve 400 of a plot comparing propeller power coefficients to advance ratios as illustrated by the arrows in FIG. 4. The plot of propeller power coefficient and advance ratio may be obtained for example from wind tunnel testing of a propeller with the same dimensions and pitch as propeller 12.

At block 318, airspeed 16 may be determined, e.g., computed by flight computer 28, through the following equation:

$$V_T = JnD$$

In the equation, $V_T$ is the true airspeed, J is the advance ratio of propeller 12, n is the rotational speed of propeller 12, for example in revolutions per second, and D is diameter 14 of propeller 12. The true airspeed may be converted to equivalent airspeed at standard sea level conditions if desired.

Figure 5:
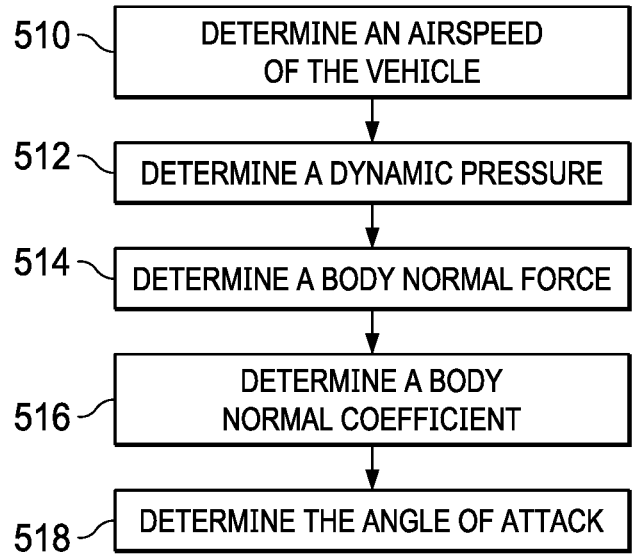
FIG. 5 illustrates an exemplary method of determining an angle of attack of a propeller power vehicle.
Figure 6:
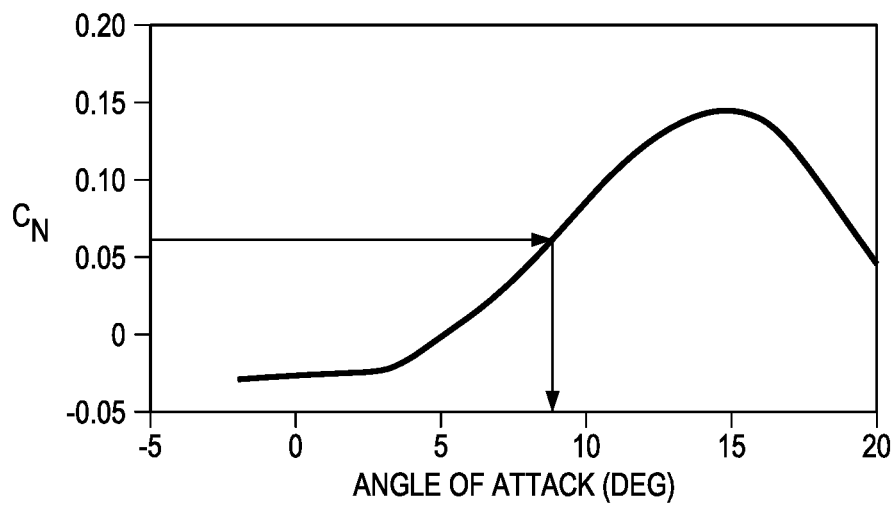
FIG. 6 is a graphical illustration of a plot comparing aircraft normal force coefficients with angle of attacks.

FIG. 5 illustrates an exemplary method 500 of determining the angle of attack 40 of propeller driven vehicle 10. At block 510, an airspeed 16 of the propeller driven vehicle 10 is determined for example without using a pitot-static probe. Airspeed 16 may be determined in accordance with method 300.

At block 512, a dynamic pressure is determined using airspeed 16. For example, dynamic pressure may be determined, e.g., computed by flight computer 28, through the following equation:

$$q = \frac{1}{2}\rho V_T^2$$

In the equation, q is the dynamic pressure, $\rho$ is the air density, and $V_T$ is the airspeed, denoted as true airspeed in this example.

At block 514, body normal force 32 (FIG. 2) is determined, e.g., computed by flight computer 28, through the following equation:

$$N = -N_z W$$

In the equation, N is the body normal force, W is the weight of vehicle 10, and $N_z$ is the body-fixed load factor, measured for example by an accelerometer 26.

At block 516, a body normal coefficient is determined, e.g., computed by flight computer 28, through the following equation:

$$C_N = \frac{N}{qS_{ref}}$$

In the equation, $C_N$ is the body normal coefficient, N is the body normal force, q is the dynamic pressure, and $S_{ref}$ is a vehicle 10 reference area, for example the wing area.

A block 518, the angle of attack 40 is determined using the body normal coefficient. In an embodiment, the angle of attack 40 is determined by matching the body normal coefficient on a lookup curve 600 of a plot comparing propeller angles of attack with body normal coefficients for known, or estimated, vehicle 10 aerodynamics as illustrated by the arrows in FIG. 6.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method to determine an airspeed of a powered vehicle comprising a flight computer, the method comprising, during flight:
   powering an unmanned aircraft with a fixed pitch propeller along a velocity vector by delivering power from an electric motor to the fixed pitch propeller;
   obtaining measurements on the unmanned aircraft of a voltage and current supplied to the electric motor, altitude, and air temperature; and
   determining an airspeed value of the unmanned aircraft using an advance ratio for the propeller, comprising:
      determining power delivered to the propeller using one or more of the measurements;
      determining air density using one or more of the measurements;
      determining a propeller power coefficient using the power delivered and the air density;
      determining the advance ratio for the propeller using the propeller power coefficient;

further comprising, during flight, determining an angle-of-attack (AOA) of the vehicle using the airspeed value; and adjusting the power delivered to the propeller based on the air speed value.

2. The method of claim 1, wherein the airspeed value is determined without the use of a pitot-static probe.

3. The method of claim 1, wherein the airspeed value is a true airspeed.

4. The method of claim 1, wherein the determining the power delivered comprises applying a motor efficiency.

5. The method of claim 1, wherein the determining the advance ratio comprises matching the propeller power coefficient on a lookup curve of a plot comparing propeller power coefficients to advance ratios for the propeller.

6. The method of claim 1, wherein the airspeed value is a true airspeed and the determining the airspeed value comprises multiplying the advance ratio with a propeller rotational speed and a propeller diameter.

7. The method of claim 1, wherein the determining the AOA comprises determining a dynamic pressure from the airspeed value.

8. The method of claim 1, wherein the determining the AOA comprises determining a dynamic pressure from the airspeed value;

determining a body normal coefficient; and using the body normal coefficient on a lookup curve of a plot comparing body normal coefficients to angles of attack.

9. The method of claim 8, wherein the body normal coefficient is determined from a body-fixed load measurement and the dynamic pressure.

10. The method of claim 9, wherein the body-fixed load measurement is obtained from an accelerometer on the unmanned aircraft.

11. A method of determining an angle-of-attack (AOA) of a powered vehicle, the method comprising, during flight:

powering an unmanned aircraft with a fixed pitch propeller along a velocity vector by delivering power from an electric motor to the fixed pitch propeller;

obtaining measurements from one or more sensors on the unmanned aircraft of a voltage and current supplied to the electric motor, altitude, and air temperature;

determining an airspeed value of the unmanned aircraft using an advance ratio and one or more of the measurements;

determining a dynamic pressure from the airspeed value;

determining a body normal coefficient;

determining the AOA by using the body normal coefficient on a lookup curve of a plot comparing body normal coefficients to angles of attack; and adjusting the power delivered to the propeller based on at least one of the air speed value or the AOA.

12. The method of claim 11, wherein the body normal coefficient is determined from a body-fixed load measurement and the dynamic pressure.

13. The method of claim 12, wherein the body-fixed load measurement is obtained from an accelerometer on the unmanned aircraft.

14. The method of claim 11, further comprising:

determining a body normal force using a body-fixed load measurement from an accelerometer on the unmanned vehicle and a weight of the vehicle; and using the body normal force and the dynamic pressure to determine the body normal coefficient.

* * * * *